United States Patent [19]
Williams, Jr.

[11] 3,883,979
[45] May 20, 1975

[54] ARTIFICIAL FISHING LURE
[76] Inventor: William O. Williams, Jr., 1309 Lynhurst Dr., Gastonia, N.C. 28052
[22] Filed: Mar. 2, 1973
[21] Appl. No.: 337,302

[52] U.S. Cl. ............ 43/42.09; 43/42.1; 43/42.28; 43/42.53
[51] Int. Cl. .......................................... A01k 85/00
[58] Field of Search ............ 43/42.09, 42.1, 42.24, 43/42.26, 42.28, 42.3, 42.35, 42.37, 42.38, 42.53, 42.41

[56] References Cited
UNITED STATES PATENTS

| | | |
|---|---|---|
| 890,549 | 9/1908 | Zamel .................................. 43/42.1 |
| 934,087 | 9/1909 | Moran .................................. 43/42.1 |
| 963,202 | 7/1910 | Bohannan ....................... 43/42.35 X |
| 1,368,939 | 2/1921 | Kelley ............................ 43/42.24 X |
| 1,611,117 | 12/1926 | Kearns .............................. 43/42.09 |
| 2,016,960 | 10/1935 | Dillon .................................. 43/42.1 |
| 2,994,982 | 8/1961 | Murawski ........................ 43/42.1 X |
| 3,199,244 | 8/1965 | Frederiksen ................... 43/42.28 X |

FOREIGN PATENTS OR APPLICATIONS

| | | |
|---|---|---|
| 1,101,159 | 10/1955 | France ............................... 43/42.35 |
| 1,490,566 | 8/1967 | France ............................... 43/42.35 |
| 1,501,858 | 11/1967 | France ............................... 43/42.35 |

Primary Examiner—Warner H. Camp
Attorney, Agent, or Firm—Richards, Shefte & Pinckney

[57] ABSTRACT

An artificial fishing lure has an exterior surface made of thin, resilient, toy balloon-like material enclosing a hook-supporting element and having a plurality of longitudinally extending tail fins concavely curved to form opposed fins with laterally outwardly disposed longitudinal edges. The hook-supporting element can be much smaller than the exterior surface material, thereby causing the fishing lure to be substantially hollow and allow it to flex and bend to simulate the natural breathing and swimming actions of fish. The artificial fishing lure is made by placing a toy balloon in flat disposition to form folded edges, cutting short slits in the balloon adjacent the open end thereof at the folded edges, cutting the balloon along the folded edges at the cut slits to form separate tail fins, and inserting a hook-supporting component into the balloon. The balloon can be turned inside-out before the hook-supporting component is inserted to cause the tail fins to be concavely curved while the remainder of the exterior surface is convexly curved.

9 Claims, 19 Drawing Figures

PATENTED MAY 20 1975 3,883,979

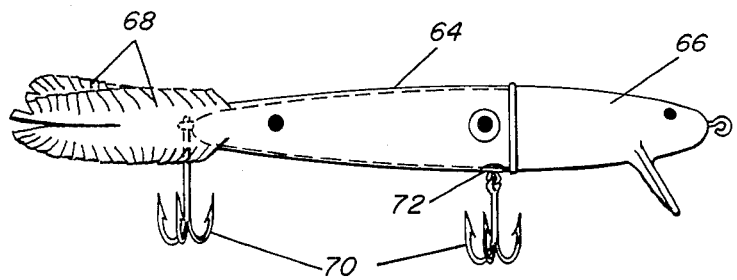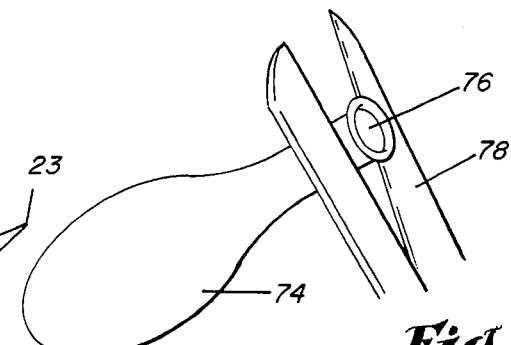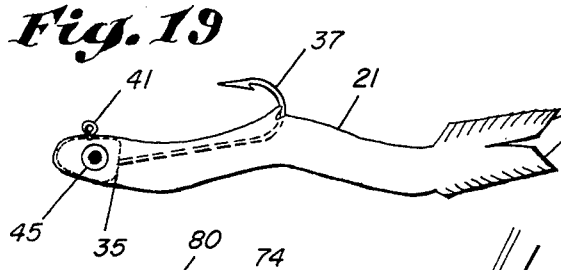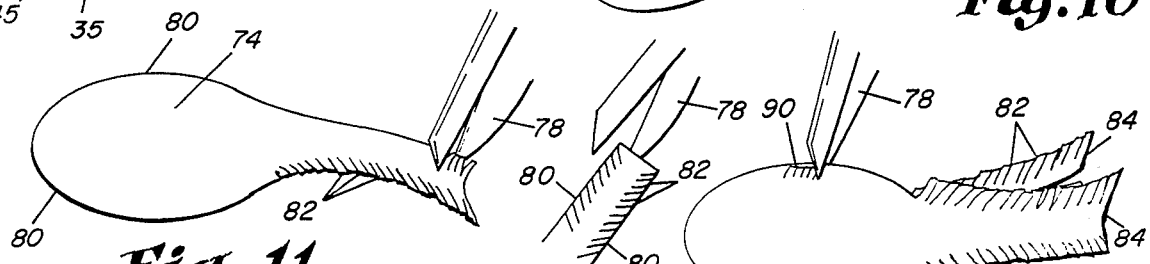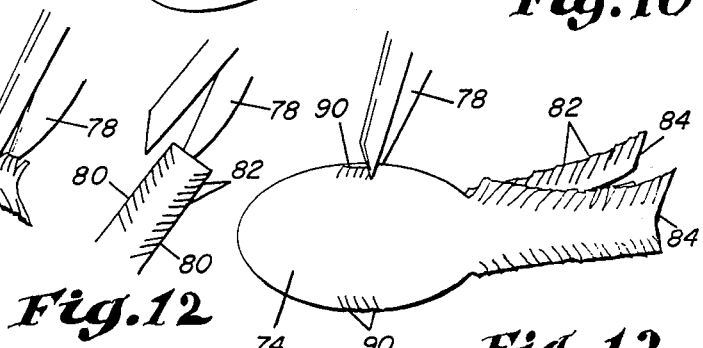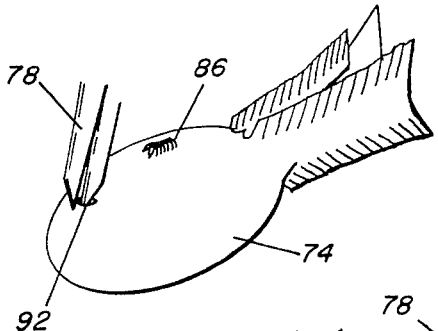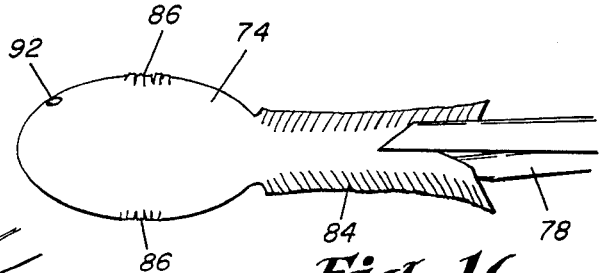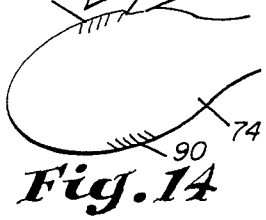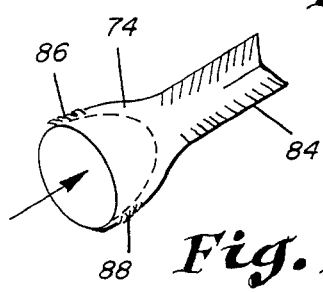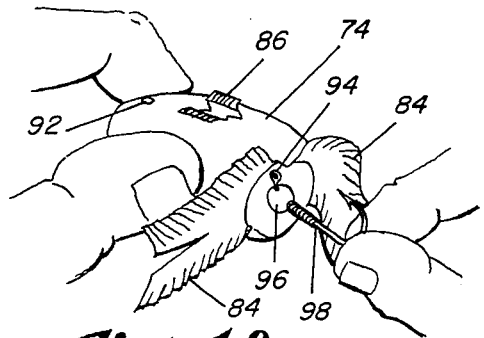

ARTIFICIAL FISHING LURE

BACKGROUND OF THE INVENTION

This invention relates to artificial fishing lures, and more particularly to artificial fishing lures having a natural life-like action. Prior art examples of this general type of fishing lure are disclosed in Sorenson U.S. Pat No. 2,027,069, issued Jan. 7, 1936, for Artificial Bait, and Lovelace U.S. Pat. No. 2,183,816, issued Dec. 19, 1939, for Fish Lure, which patents disclose artificial lures that are intended to simulate the natural breathing and swimming action of live fish. In each of these patents there is disclosed a head portion to which is attached a flexible envelope made of cloth, rubber, or other suitable pliable material. The hook is attached to the head portion and, in Sorenson, remains totally within the envelope, while in Lovelace the hook extends outwardly from the envelope. Each of the artificial lures is provided with holes at the forward and rearward portions thereof to allow the passage of water through the flexible envelope to create the simulated natural fish breathing and swimming motions. Although the flexible envelopes of these prior art lures may be fish shaped, neither of these lures has any special separate fin configuration.

The fish lures of the above patents require the action of water passing through the inside of their flexible envelopes to simulate the natural motions of a fish, while the flexible skin material of the artificial fishing lures described herein allows the simulation of natural fish breathing and swimming motion without relying on water flow through the lure. This allows for more flexibility in design, i.e., the lure can be substantially closed at the head end thereof, and provides life-like motion without requiring the angler to use any specific manipulating techniques.

The artificial fishing lures described herein provide the advantages of life-like appearance, natural motion, and flexibility of design. These advantages are provided by utilizing a thin, resilient, and flexible material to form the outer surface of the fishing lures and forming separate tail fin-forming sections for enhanced action. The prior art does not teach this, nor does it teach concavely curved fin-forming sections or turning the exterior surface material inside-out to provide such concavely curved sections and a correspondingly rotundly convexly curved body portion to provide a more natural appearance.

SUMMARY OF THE INVENTION

The artificial fishing lure of the present invention has a hook-supporting portion and an exterior surface-forming portion made of thin, resilient, toy balloon-like material enclosing the hook-supporting portion and having a plurality of longitudinally extending separate tail fin-forming sections. In one embodiment, the fin-forming sections are concavely curved to form opposed fins with laterally outwardly disposed lonitudinal edges, which fins may be in the form of a pair of fins disposed vertically in face-to-face relation and may have short slits cut inwardly in their longitudinal edges to provide a natural fin appearance. In a preferred embodiment, the exterior surface-forming portion of the artificial fishing lure is rotundly convex and the tail fin-forming sections are correspondingly concave to provide a more natural appearance. It is also preferred that the artificial fishing lure have one or two pairs of longitudinally extending intermediate fin-forming sections which project concavely from the surface-forming portion in spaced face-to-face relation to resemble, for example, dorsal and anal fins. If desired for particular purposes, the hook-supporting portion may project outwardly from the head end of the surface-forming portion, which may have an open front end to accomodate this arrangement.

In another embodiment, the surface-forming portion is closed at the head end thereof and is substantially larger than the hook-supporting portion so that even though the hook-supporting portion is disposed within the surface-forming portion, there is a substantial free interior space that permits flexing of the surface-forming portion in a life-like manner. Preferably, the hook-supporting portion includes means for attaching it to a fishing line, which means projects through the surface-forming portion adjacent the head end thereof and may include a fish line-attaching eyelet. As in the first embodiment, the tail fin-forming sections may have short slits cut inwardly in their longitudinal edges to provide a natural fin appearance and may have one or two pairs of longitudinally extending intermediate fin-forming sections projecting therefrom in spaced face-to-face relation. This embodiment may also include all of the features of the concavely curved fin configuration discussed above.

According to the present invention, artificial fishing lures are made by positioning a hollow, thin, resilient, toy balloon-like component in flat disposition to form a pair of spaced folded peripheral edges extending from an open end of the balloon-like component. Short inwardly extending slits are cut in spaced relation into the balloon-like component from the folded edges, and the balloon-like component is then cut along the folded edges from the open end through the slits to form separate tail fin-forming sections. Finally, a hook-supporting component is inserted into the balloon-like component, preferably through the open end thereof. The balloon-like component may be substantially larger than the hook-supporting component to provide a substantial free space within the balloon-like component, and a small hole may be cut in the balloon-like component adjacent the head end thereof through which an eyelet on the hook-supporting component may be projected for attachment to a fishing line. The invention may include cutting short inwardly extending slits in spaced relation into the balloon-like component from the folded edges intermediate the ends thereof and then cutting along the folded edges through the slits to form intermediate fin-forming sections. Further, a longitudinal cut may be made in the end of the tail fin-forming sections to enhance mobility. Where the balloon-like component has a lipped open end, the invention may include the cutting the balloon-like component to remove the lipped open end. The head end of the balloon-like component may be left closed, enclosing the front of the hook-supporting component, or may be cut open for mounting on the hook-supporting portion so that the latter, which may be a spoon or plug, may project outwardly therefrom.

In the preferred embodiment of the present invention, the balloon-like component is turned inside-out to dispose the cut tail fin-forming sections in opposing concave disposition whereas the remainder of the balloon-like component is correspondingly convex. This is preferably performed before the hook-supporting portion is inserted within the balloon-like component. The above-described intermediate fin-forming sections may be included, in which case they also will project concavely as a result of the turning of the balloon-like component inside-out.

BRIEF DESCRIPTION OF THE DRAWINGS

FIG. 9 is a side view of a lure of the present invention in which the hook-supporting portion is a solid lure itself;

FIG. 10 illustrates the first step of the method of the present invention, i.e., cutting off the lipped end of a balloon-like component;

FIG. 11 shows the balloon-like component of FIG. 10 disposed in flat planar relation and the scissors cutting slits thereinto adjacent the open end thereof;

FIG. 12 shows the scissors cutting longitudinally along the folded edges through the slits of the balloon-like component of FIG. 11;

FIG. 13 shows the scissors making intermediate slits in the balloon-like component of FIG. 12 to form the intermediate fins;

FIG. 14 shows scissors cutting longitudinally through the intermediate slits to form the intermediate fins in the balloon-like component of FIG. 13;

FIG. 15 shows the scissors cutting a small hole at the head end of the balloon-like component of FIG. 14;

FIG. 16 shows the scissors making longitudinal cuts in the tail fin-forming sections of the balloon-like component of FIG. 15;

FIG. 17 shows the balloon-like component being turned inside-out;

FIG. 18 shows the hook-supporting component being inserted into the balloon-like component; and FIG. 19 shows another embodiment wherein the balloon-like component is elongated, simulating a worm.

DESCRIPTION OF THE PREFERRED EMBODIMENTS

Figure 1:
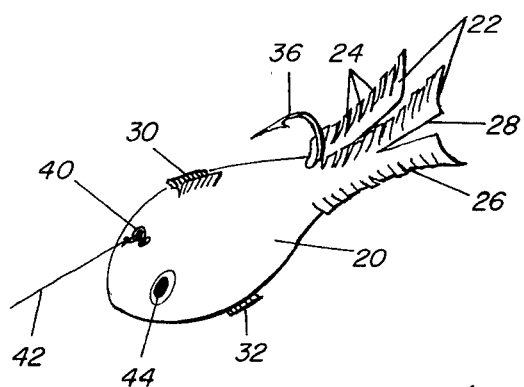
FIG. 1 is a perspective side view of a preferred artificial fishing lure according to the present invention, having tail, dorsal, and anal fins, an eyelet projecting from the head end thereof, and being closed at the head end thereof.
Figure 2:
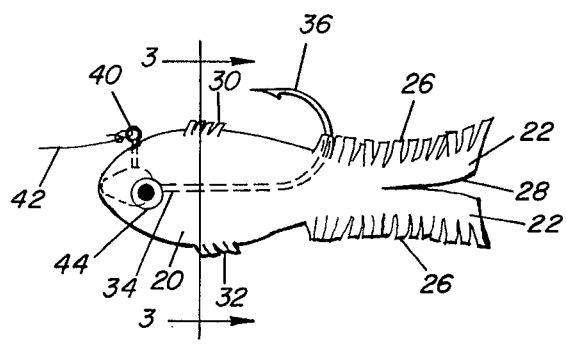
FIG. 2 is a side view of the lure of FIG. 1 showing by dotted lines the hook-supporting component disposed within the balloon-like component.

Referring to the drawings a preferred embodiment of the artificial fishing lure of the present invention is illustrated in FIGS. 1–5, and is shown therein as having an exterior surface-forming portion 20 that constitutes a hollow toy balloon-like component simulating the appearance of a live fish and which is made of thin, resilient, toy balloon-like material. The use of this material allows the surface-forming portion or balloon-like component 20 to flex, bend, and quiver in the water to simulate the natural breathing and swimming motions of a live fish, while giving it even more action than an actual fish and thus making it more attractive to the predatory fish and giving it greater utility as a fishing lure. The surface-forming portion 20 is closed at the head end and open at the rear end, from which rear end extend two tail fin-forming sections 22 having short slits 24 cut inwardly in their longitudinal edges 26 to provide a natural fin appearance and having longitudinal slits 28 extending forwardly from the rear end thereof. Being closed at the head end provides the lure with a sound cushion which deadens the unnatural sounds which occur when a metal lure strikes a rock in the water. Thus, the predatory fish will not be frightened away by the sound. Intermediate the head and rear ends of the surface-forming portion 20 and at the top and bottom thereof, respectively, are pairs of longitudinally extending intermediate fin-forming sections 30 and 32 projecting concavely in spaced face-to-face relation to resemble dorsal and anal fins, 30 and 32, respectively.

Figure 3:
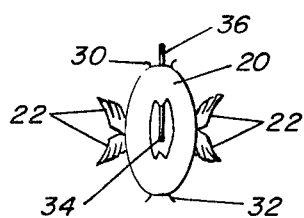
FIG. 3 is a vertical sectional view taken along line 3—3 of FIG. 2, showing the hook-supporting component inside the balloon-like component and the lure substantially hollow inside.

The above-described surface-forming portion 20 encloses a hook-supporting portion or component 34 from which a hook 36 extends rearwardly and outwardly through the open rear end 38 of the surface-forming portion 20 and an eyelet 40 extends through the head end of the surface-forming portion 20 for attachment of a fishing line 42 thereto. In order to better simulate the natural breathing and swimming motions of a fish, it is preferred that a substantial amount of free space be present within the surface-forming portion 20 so that it can freely flex and quiver in a life-like manner in response to undulations in the water. As illustrated in FIG. 3 the surface-forming portion 20 of this embodiment is much larger than the hook-supporting portion 34 and is rotundly formed to provide ample free space for flexing.

Figure 4:
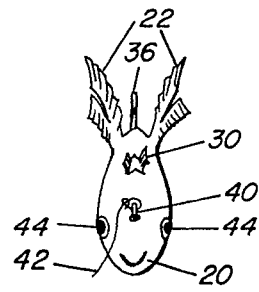
FIG. 4 is a perspective front view of the lure of FIG. 1 showing the opposing concave curvature of the fins in relation to the convex remainder of the exterior surface-forming portion of the lure.
Figure 5:
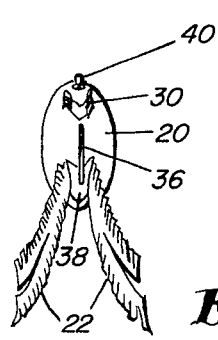
FIG. 5 is a perspective rear view of the lure of FIG. 1, also showing the opposing concave curvature of the fins.

Also, to better simulate the natural appearance of a fish, it is preferred that the tail fin-forming sections 22 and the intermediate fins 30 and 32 have a concave curvature opposite that of the rotundly convex surface of the remainder of the surface-forming portion 20 (See FIGS. 4 and 5). The opposite concave curvature makes the fins more pronounced in appearance and allows the fins to move and quiver more in the water, thereby simulating natural motion and providing more action than an actual fish. To enhance further the attractiveness of the lure, the surface-forming portion 20 may be brightly colored and eyes 44 may be painted, molded, or stamped on the head end.

Figure 6:
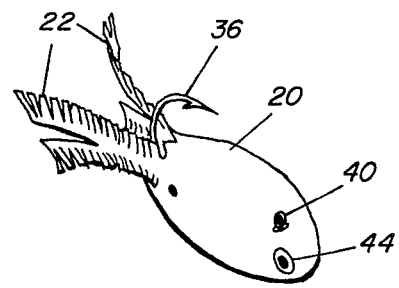
FIG. 6 is a perspective side view of a lure similar to that of FIG. 1, but without dorsal and anal fins.

A variation of the lure of FIGS. 1–5 is illustrated in FIG. 6, which illustrates a lure identical to that of FIGS. 1–5 and bearing identical reference numerals, but does not have any intermediate fin-forming portions formed therein.

Figure 7:
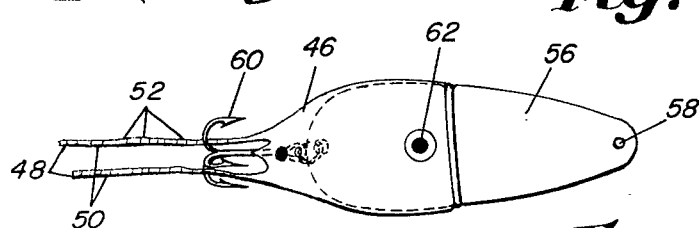
FIG. 7 is a side view of a lure of the present invention in which the hook-supporting component is a spoon.
Figure 8:
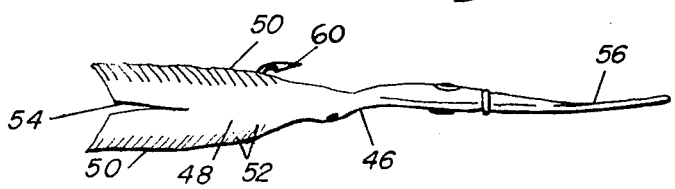
FIG. 8 is a plan view of the lure of FIG. 7.

Another embodiment of the lure of the present invention is illustrated in FIGS. 7 and 8, which shows a surface-forming portion 46 that is open both at the rear end and at the front end, and has a pair of longitudinally extending separate tail fin-forming sections 48 similar to the above-described embodiment but considerably longer and more rounded at their outer ends. Thus, these tail fin-forming sections 48 are concavely curved to form opposed fins with laterally outwardly disposed longitudinal edges 50 having short slits 52 therein, and longitudinal slits 54 extending from the rears ends thereof. The surface-forming portion 46 is mounted upon a hook-supporting portion 56, which in this embodiment is a slightly dished spoon, over about the rear half of which the surface-forming portion 46 is stretched without any appreciable free space or flexing action. The spoon 56 has an eyelet 58 at the head end thereof disposed outside the surface-forming portion 46 for attachment to a fishing line. A hook 60 is attached to the hook-supporting portion 56 inside the surface-forming portion 46 and extends through the open rear end thereof. A fish eye 62 may also be included on the head end of the surface-forming portion.

A further embodiment is illustrated in FIG. 9, which shows a surface-forming portion 64 that is open both at its front and rear ends and is stretched over the rear half of a hook-supporting portion 66 that is in the form of a solid plug or lure, thus giving the appearance of a minnow or fish with another minnow or fish in its mouth. In this embodiment the surface-forming portion 64 has two longitudinally extending separate tail fin-forming sections 68 extending from the rear end thereof in the same manner and of the same general construction as in the preceding embodiments. There are two hooks 70 attached to the hook-supporting portion 66, one at the rear end thereof extending outwardly from the surface-forming portion 64 through its open rear end, and the other attached to the hook-supporting portion 66 intermediate the ends thereof and extending outwardly from the surface-forming portion 64 through a hole 72 therein adjacent the front end thereof.

Another embodiment is illustrated by FIG. 19, which shows a lure having an elongated and wavy surface-forming portion 21 that simulates a live worm. It is closed at the head end and has two longitudinally extending tail fin-forming sections 23 extending from its rear end. These tail fin-forming sections 23 are of the same general construction as in the preceding embodiments, A hook-supporting portion 35, having a hook 37 and an eyelet 41 attached thereto as in preceding embodiments, is disposed within the surface-forming portion 21 at the head end thereof. The hook 37 extends outwardly from the surface-forming portion 21 through a hole which is intermediate the ends thereof. As in the other embodiments, an eye 45 is formed near the head end of the surface-forming portion 21.

All of the above-described lures could be formed by molding suitable materials into the described shapes although in the preferred embodiment they are made from toy balloons. Further, the lures are interchangeable with various hook-supporting components. One hook may be used with several surface-forming portions, and if one color or shape is not effective, the hook can be removed and inserted into another surface-forming portion of a different color or shape.

The artificial fishing lures described in detail herein are made according to the method of the present invention, the preferred embodiment of which is illustrated in FIGS. 10-18 in relation to making the lure of FIGS. 1-5. This method is practiced using a hollow, thin, resilient toy balloon-like component 74, which preferably is in fact a toy balloon. To start with, the lipped open end 76 of the balloon 74 is cut off with a pair of scissors 78 (FIG. 10). The balloon 74 is then layed out in flat disposition (FIG. 11) to form a pair of spaced folded peripheral edges 80 extending from the open end, and the scissors 78 are then used to cut a series of short inwardly extending slits 82 in spaced relation into the balloon 74 from the folded edges 80 and adjacent the open end. Next, the balloon 74 is cut along the folded edges 80 from the open end through the series of slits 82 (FIG. 12) to form separate tail fin-forming sections 84.

Intermediate fin-forming sections 86 and 88 are then formed by cutting short inwardly extending intermediate slits 90 into the balloon 74 from the folded edges 80 intermediate the ends thereof (FIG. 13) and then cutting the balloon 74 along the folded edges 80 through the intermediate slits 90 (FIG. 14) to form the outer edges of the intermediate fin-forming sections 86 and 88. A small hole 92 is cut in the head of the balloon 74 (FIG. 15) for subsequent insertion of a fishing line-attaching eyelet 94 therethrough, and the tail fin-forming sections 84 are cut longitudinally from the rear ends thereof (FIG. 16).

The next step in the method is turning the balloon 74 inside-out by turning the head end through the interior of the balloon 74 (FIG. 17) or otherwise. This results in the tail fin-forming sections 84 and intermediate fin-forming sections 86 and 88, which are free to retain their original curvature, assuming a concave curvature while the remainder of the balloon 74 assumes a convex curvature.

Finally, the hook-supporting portion 96 having a hook 98 attached thereto is inserted through the rear end of the balloon 74 (FIG. 18) and the eyelet 94 passed through the hole 92 for attachment to a fishing line.

The sequence of the steps of the method may be varied for convenience or particular preference as the various cutting steps may be performed in any order and the turning inside-out may be performed before some or all of the cutting steps.

To make the lure of the embodiment of FIG. 6, the above-described method may be practiced without the steps of cutting to form intermediate fin-forming portions. The same method may also be followed to make the lures of the embodiments of FIGS. 7 and 8, and FIG. 9, with the additional step of cutting the head end of the balloon to allow it to be stretched over the spoon 56 (FIGS. 7 and 8) or solid lure 66 (FIG. 9), and in the case of the FIG. 9 embodiment the hole 72 for the front hook 36 is cut in the balloon prior to assembly of the balloon on the solid lure 66. The lure of the embodiment at FIG. 19 is made according to the method of making the FIG. 6 embodiment, except that an elongated balloon-like component 21 is used and a hole is cut intermediate the ends thereof for insertion of the hook-supporting portion 35 and extension of the hook 37 therethrough. The present invention has been described in detail above for purposes of illustration only and is not intended to be limited by this description or otherwise to exclude any variation or equivalent arrangement that would be apparent from, or reasonably suggested by, the foregoing disclosure to the skill of the art.

What is claimed is:

1. An artificial fishing lure comprising a hook and a supporting portion therefor, an exterior surface-forming portion of thin, resilient, toy balloon-like material mounted on and enclosing said hook-supporting portion, said surface-forming portion including a plurality of outwardly curved tail fin-forming sections extending freely and separately in a longitudinal direction at the rear end of said surface-forming portion, said material for each of said tail fin-forming sections being formed with a concave curvature transversely to the longitudinal extent thereof to thereby form opposed fins with laterally outwardly disposed longitudinal edges, and said surface-forming portion having an open rear end between said tail fin-forming sections through which said hook-supporting portion is insertable and removable.

2. An artificial fishing lure as defined in claim 1 and further characterized in that said tail fin-forming sections comprise a pair of fins disposed vertically in face-to-face relation.

3. An artificial fishing lure as defined in claim 1 and further characterized in that said fin-forming sections have short slits cut inwardly in their longitudinal edges to provide a natural fin appearance.

4. An artificial fishing lure as defined in claim 1 and further characterized in that said exterior surface-forming portion is rotundly convex and said tail fin-forming sections are correspondingly concave.

5. An artificial fishing lure as defined in claim 1 and further characterized in that said surface-forming portion has a pair of longitudinally extending intermediate fin-forming sections formed from the surface thereof and projecting concavely therefrom in spaced face-to-face relation.

6. An artificial fishing lure as defined in claim 1 and further characterized in that said surface-forming portion has two pairs of longitudinally extending intermediate fin-forming sections projecting concavely therefrom in spaced face-to-face relation and located to resemble dorsal and anal fins.

7. An artificial fishing lure as defined in claim 1 and further characterized in that a fish line attaching eyelet is secured to said hook-supporting portion and projects therefrom through said surface-forming portion adjacent the head end thereof.

8. An artificial fishing lure as defined in claim 1 and further characterized in that said hook-supporting portion engages the interior of the surface-forming portion at the head end thereof.

9. An artificial fishing lure as defined in claim 1 and further characterized in that said tail fin-forming sections comprise a pair of fins disposed vertically in face-to-face relation and having short slits cut inwardly in their longitudinal edges to provide a natural fin appearance, said surface-forming portion is rotundly convex and said tail fin-forming sections are correspondingly concave, said surface-forming portion has two pairs of longitudinally extending intermediate fin-forming sections projecting concavely therefrom in spaced face-to-face relation, said hook-supporting portion engages the interior of the surface-forming portion at the head end thereof, and a fish line-attaching eyelet is secured to said hook-supporting portion and projects therefrom through said surface-forming portion adjacent the head end thereof.

* * * * *

PO-1050
(5/69)

UNITED STATES PATENT OFFICE
CERTIFICATE OF CORRECTION

Patent No. 3,883,979     Dated May 20, 1975

Inventor(s) William O. Williams

It is certified that error appears in the above-identified patent and that said Letters Patent are hereby corrected as shown below:

Column 1, line 58, delete "lonitudinal" and insert therefor --longitudinal--; Column 5, line 42, after "ments" delete "," and insert therefor --.--; Column 7, line 17, after "said" insert --tail--; and Column 8, lines 8 and 9, delete "adjecent" and insert therefor --adjacent--.

Signed and Sealed this twenty-ninth Day of July 1975

[SEAL]

Attest:

RUTH C. MASON
Attesting Officer

C. MARSHALL DANN
Commissioner of Patents and Trademarks